US009673861B2

(12) United States Patent
Heinikoski et al.

(10) Patent No.: US 9,673,861 B2
(45) Date of Patent: Jun. 6, 2017

(54) CANCELLING CROSSTALK

(71) Applicant: Telefonaktiebolaget L M Ericsson (publ), Stockholm (SE)

(72) Inventors: Kauko Heinikoski, Oulu (FI); Marko E. Leinonen, Haukipudas (FI)

(73) Assignee: OY L M ERICSSON AB, Jorvas (FI)

( * ) Notice: Subject to any disclaimer, the term of this patent is extended or adjusted under 35 U.S.C. 154(b) by 32 days.

(21) Appl. No.: 14/434,349

(22) PCT Filed: Jul. 14, 2014

(86) PCT No.: PCT/SE2014/050892
§ 371 (c)(1),
(2) Date: Apr. 8, 2015

(87) PCT Pub. No.: WO2016/010464
PCT Pub. Date: Jan. 21, 2016

(65) Prior Publication Data
US 2016/0277068 A1    Sep. 22, 2016

(51) Int. Cl.
*H04L 5/14* (2006.01)
*H04B 3/32* (2006.01)
*H04B 1/525* (2015.01)
*H04B 1/04* (2006.01)

(52) U.S. Cl.
CPC ............. *H04B 3/32* (2013.01); *H04B 1/0475* (2013.01); *H04B 1/525* (2013.01); *H04L 5/1461* (2013.01)

(58) Field of Classification Search
CPC .................................................... H04L 5/1461
See application file for complete search history.

(56) References Cited

U.S. PATENT DOCUMENTS

| 2008/0260066 A1* | 10/2008 | Cai ........................ H03F 1/3294 375/297 |
| 2010/0150033 A1* | 6/2010 | Zinser .................... H04L 5/1461 370/278 |
| 2011/0228828 A1* | 9/2011 | Wang ...................... H04B 1/126 375/219 |
| 2012/0071105 A1* | 3/2012 | Walker .................... G01S 7/021 455/67.11 |
| 2012/0295558 A1 | 11/2012 | Wang et al. |
| 2012/0327818 A1* | 12/2012 | Takatori .................... H04L 5/14 370/277 |
| 2013/0183921 A1* | 7/2013 | Mu ......................... H03D 7/166 455/326 |

(Continued)

OTHER PUBLICATIONS

Amin, et al., "Transmit and Receive Crosstalk Cancellation", 6th International Conference on Emerging Technologies, IEEE, 2010, pp. 210-215.

(Continued)

*Primary Examiner* — David Bilodeau
(74) *Attorney, Agent, or Firm* — Nicholson De Vos Webster & Elliott LLP

(57) ABSTRACT

Cancelling crosstalk between at least one transmitter chain and a receiver chain in a wireless communication node makes use of a single feedback path from the transmitter chain that is shared between processing of transmit signals (x) in the transmitter chain and reception signals (s) received in the receiver chain. Information in the shared feedback is used in a crosstalk model to cancel crosstalk in the reception signals.

22 Claims, 5 Drawing Sheets

(56) References Cited

U.S. PATENT DOCUMENTS

2015/0282099 A1* 10/2015 Laaser ................ H04W 52/243
455/67.13

OTHER PUBLICATIONS

International Search Report and Written Opinion for Application No. PCT/SE2014/050892, mailed Apr. 8, 2015, 9 pages.
International Preliminary Report on Patentability for Application No. PCT/SE2014/050892, mailed Jun. 27, 2016, 13 pages.

* cited by examiner

CANCELLING CROSSTALK

CROSS-REFERENCE TO RELATED APPLICATIONS

This application is a National stage of International Application No. PCT/SE2014/050892, filed Jul. 14, 2014, which are hereby incorporated by reference.

TECHNICAL FIELD

Embodiments herein relate to cancelling crosstalk between a transmitter chain and a receiver chain in a wireless communication node.

BACKGROUND

A problem related to radio receivers in small wireless communication devices is that the radio frequency (RF) components need to be miniaturized. However, miniaturization of RF components will typically result in RF components that have reduced performance, in terms of noise and RF interference performance etc., than RF components that are not miniaturized, for example components that are used in products such as radio base stations. Furthermore, RF components need to be cost effective and power efficient which sets additional performance challenges. Hence, in order to enable use of such reduced performance RF components while still maintaining good radio performance in radio receivers, improved interference cancellation is needed.

As will be illustrated in more detail below, sensitivity in a receiver (RX) chain in a node that comprises also a transmitter (TX) chain may be degraded due to so-called crosstalk between the TX chain and the RX chain. In the context of the present disclosure, crosstalk comprises limited TX-RX isolation in a duplex filter or direct coupling from TX to RX or due to spurious frequencies generated by passive and/or active intermodulation in the RF components, which may fall within the RX own frequency band and thus degrading the RX sensitivity. The degradation of the RX sensitivity may be severe, for example in some frequency bands it may be larger than 10 dB.

In the prior art, attempts have been made to overcome such drawbacks. For example, in Transmit and Receive Crosstalk Cancellation by authors Amin and Weber, 978-1-4244-8058-6/10/$26.00 ©2010 IEEE 2010 6th International Conference on Emerging Technologies (ICET) pages 210-215 attempts are made to cancel crosstalk by using two feedback paths from a TX chain; one path provides feedback to a pre-distortion process and a second path provides feedback for cancelling intermodulation interference.

Furthermore, U.S. patent application publication US 2012/0295558 describes crosstalk cancellation and dynamic cancellation of passive intermodulation interference. The method presented in US 2012/0295558 requires a test signal that originates from a test signal transmitter.

SUMMARY

In view of the above there is a need for improving the ways in which crosstalk is handled in wireless communication nodes. An object of the present disclosure is to provide embodiments of how to accomplish this object.

Hence, in one aspect there is provided a method, performed by a wireless communication node, for cancelling crosstalk between at least one transmitter chain and a receiver chain. The method comprises obtaining a digital observation signal sample. The digital observation signal sample is in the form of a digital sample of a signal originating from a point in a first transmitter chain that is subsequent to power amplification. A digital sample of a reception signal from the receiver chain is obtained. Based on the digital observation signal sample, processing takes place of a digital transmit signal sample originating from digital circuitry in the wireless communication node, for transmission in the first transmitter chain. Based on the digital observation signal sample, a crosstalk model value is calculated from a crosstalk model. The crosstalk model value represents an interference signal created as a consequence of crosstalk between the first transmitter chain and the receiver chain. The crosstalk model value is subtracted from the digital sample of the reception signal and thereby obtaining an output digital signal sample from which crosstalk is cancelled.

In other words, a single feedback path from the TX chain is shared between processing of transmit signals in the TX chain and reception signals received in the RX chain. Information in the shared feedback is used in a crosstalk model to cancel crosstalk in the reception signals. Such a method is advantageous at least in that a dual feedback is avoided.

In some embodiments, an additional digital observation signal sample is obtained. The additional digital observation signal sample is in the form of a digital sample of an additional signal originating from a point in an additional transmitter chain that is subsequent to power amplification. Based on the additional digital observation signal sample, calculation is made of a second crosstalk model value from an additional crosstalk model. The second crosstalk model value represents an additional interference signal created as a consequence of crosstalk between the additional transmitter chain and the receiver chain. The second crosstalk model value is subtracted from the digital sample of the reception signal, thereby obtaining an output digital signal sample from which crosstalk is cancelled.

In some embodiments, an additional digital observation signal sample is obtained. The additional digital observation signal sample is in the form of a digital sample of an additional signal originating from a point in an additional transmitter chain that is subsequent to power amplification. In these embodiments, the crosstalk model value is calculated from the crosstalk model, based on the digital observation signal sample and based on the additional digital observation signal sample, the crosstalk model value representing an interference signal created as a consequence of crosstalk between the first transmitter chain and the receiver chain and crosstalk between the additional transmitter chain and the receiver chain.

In other words, embodiments where an additional digital observation signal sample is obtained from a point in an additional transmitter chain further accentuate the advantages as summarized above. That is, the number of feedback paths are kept at a minimum when feedback is obtained from one or more additional TX chains, such as in a multiple input multiple output (MIMO) context.

In another aspect there is provided a wireless communication node, comprising at least one radio frequency circuitry transmitter chain, a radio frequency receiver chain, a processor and a memory. The memory contains instructions executable by the processor whereby the wireless communication node is operative to control the wireless communication node by obtaining a digital observation signal sample in the form of a digital sample of a signal originating from a point in a first transmitter chain that is subsequent to power amplification. A digital sample of a reception signal from the receiver chain is obtained. Based on the digital observation signal sample, processing takes place of a digital transmit signal sample originating from digital circuitry in the wireless communication node, for transmission in the first transmitter chain. Based on the digital observation signal sample, a crosstalk model value is calculated from a crosstalk model. The crosstalk model value represents an interference signal created as a consequence of crosstalk between the first transmitter chain and the receiver chain. The crosstalk model value is subtracted from the digital sample of the reception signal and thereby obtaining an output digital signal sample from which crosstalk is cancelled.

In some embodiments, the wireless communication node comprises an additional transmitter chain. In these embodiments, the wireless communication node is operative to control the wireless communication node by obtaining an additional digital observation signal sample in the form of a digital sample of an additional signal originating from a point in the additional transmitter chain that is subsequent to power amplification. Based on the additional digital observation signal sample, a second crosstalk model value is calculated from an additional crosstalk model, the second crosstalk model value representing an additional interference signal created as a consequence of crosstalk between the additional transmitter chain and the receiver chain. The second crosstalk model value is subtracted from the digital sample of the reception signal, thereby obtaining an output digital signal sample from which crosstalk is cancelled.

In some embodiments, the wireless communication node comprises an additional transmitter chain. In these embodiments, the wireless communication node is operative to control the wireless communication node by obtaining an additional digital observation signal sample in the form of a digital sample of an additional signal originating from a point in the additional transmitter chain that is subsequent to power amplification. In these embodiments, the crosstalk model value is calculated from the crosstalk model, based on the digital observation signal sample and based on the additional digital observation signal sample.

In addition to the effects and advantages provided by the embodiments of methods, as summarized above, these embodiments of an apparatus aspect provides, for example, an advantage related to hardware implementation. That is, in a node such as a radio base station configured for MIMO and/or carrier aggregation (CA) where multiple RF circuitry blocks typically are present, a single processing circuitry may be used for handling the feedback (i.e. the observation signal samples) and the processing that provides the crosstalk cancellation.

In yet another aspect there is provided a computer program, comprising instructions which, when executed on at least one processor in a wireless communication node, cause the wireless communication node to carry out the method as summarized above.

In yet another aspect there is provided a carrier comprising such a computer program, wherein the carrier is one of an electronic signal, an optical signal, a radio signal and a computer readable storage medium.

These aspects provide the same effects and advantages as summarized above.

DETAILED DESCRIPTION

Figure 1A:
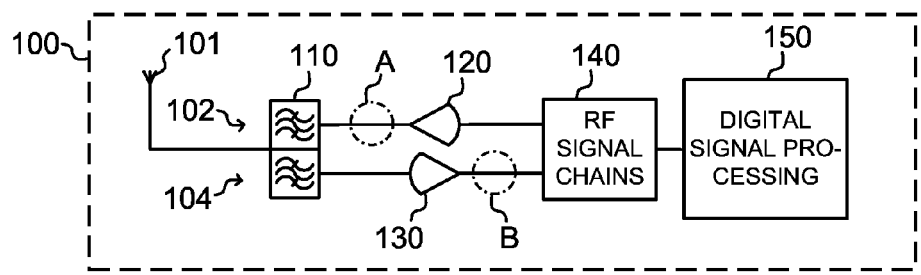
FIG. 1a schematically illustrates a wireless communication node.
Figure 1B:
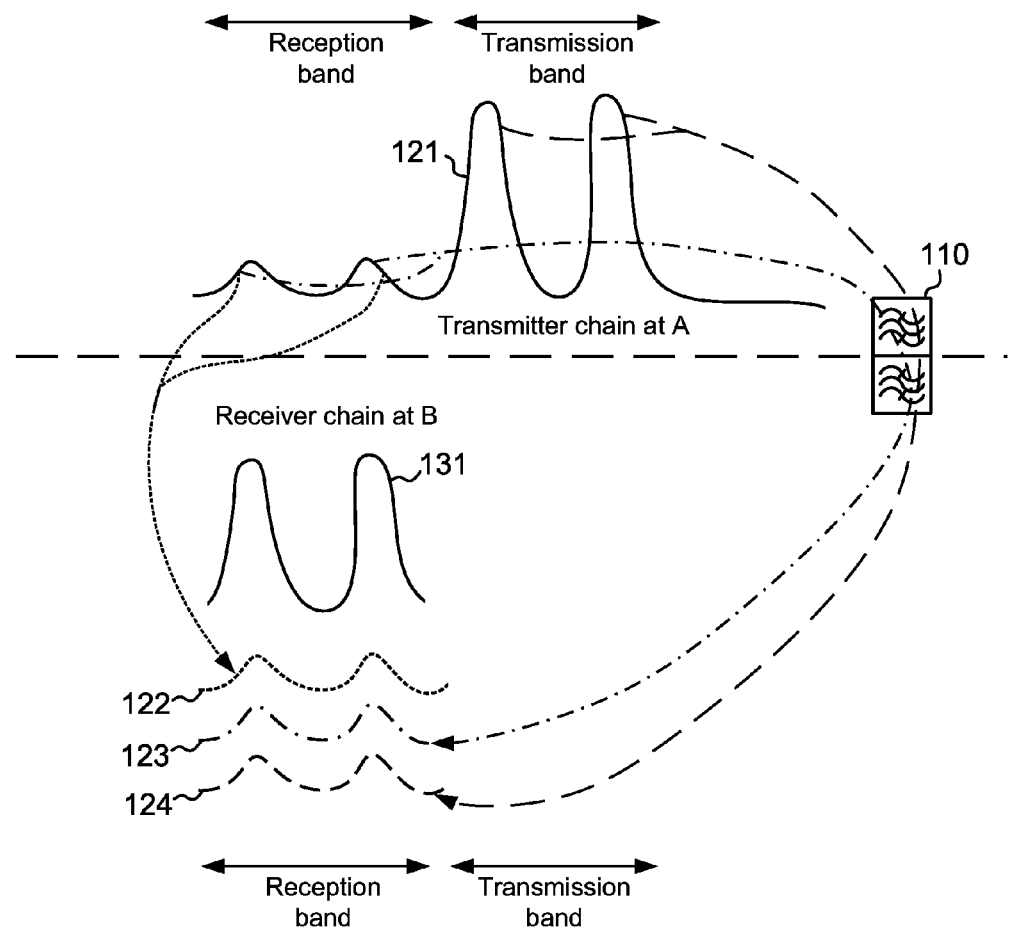
FIG. 1b schematically illustrates graphs of signals and crosstalk.

FIG. 1a and FIG. 1b illustrate in some more detail problems that the present disclosure addresses. The schematically presented block diagram in FIG. 1a is a simplified presentation of wireless communication node 100. The wireless communication node 100 comprises an antenna 101, a duplex filter 110, a low noise amplifier 120, a power amplifier 130, RF signal circuitry 140, which may comprise (not shown in FIG. 1a) analog to digital (A/D) and digital to analog (D/A) converters, variable gain amplifiers, frequency mixers, intermediate frequency (IF) and/or base band filters etc. The wireless communication node 100 also comprises a digital signal processing block 150, which may be implemented with a field-programmable gate array (FPGA), central processing unit (CPU) or any other appropriate digital processing means.

A transmitter chain 102 and a receiver chain 104 are indicated in FIG. 1a. In the transmitter chain 102, signals are created in transmitter chain functions in the digital signal processing block 150 and conveyed via transmitter chain functions in the RF signal circuitry 140 and transmitted via the power amplifier and the antenna 101. In the receiver chain 104, RF signals are received in the antenna 101 are conveyed via the duplex filter 110, the LNA 130 and receiver chain functions in the RF signal circuitry 140 and in the digital signal processing block 150.

As briefly discussed above, a problem which needs to be overcome is that a received signal is deteriorated with an interference signal that originates from a TX signal and this interference degrades the received signal quality. If the interference signal from the TX signal is known in terms of frequency, amplitude and phase then it may be compensated, i.e. cancelled, in the RX chain by way of digital signal processing. Known interferences which will degrade the received signal originate from transmission in the TX chain by a characteristic that is named crosstalk or cross coupling.

There are at least three different mechanisms for crosstalk: TX signal distortion components direct crosstalk to a RX frequency, crosstalk due to the lack of isolation and TX signal creating intermodulation products (IMD) to a RX frequency. All of these interfering components can be corrected in the receiver chain signal processing block 150. This may be done by modelling the crosstalk path in amplitude and phase. For example, transmission interference at reception frequency through the duplex filter may be modelled with a complex filter which includes both amplitude and phase information.

FIG. 1b illustrates this in some more detail. A transmitter chain signal spectrum at a location A is denoted 121. The duplex filter 110 is schematically positioned at a dashed dividing line between the transmitter chain 102 and the receiver chain 104.

Direct transmission signal crosstalk from transmitter to receiver which may happen inside any component such as integrated circuits in the wireless communication node, via printed wire boards in the wireless communication node 100 or any other means. This direct transmission signal crosstalk is illustrated with a short dashed spectrum 122 at a location B in the receiver chain. Insufficient isolation in the duplex filter 110 or attenuation from transmission chain to reception chain is illustrated with a dot dashed spectrum 123 in the receiver chain. Passive intermodulation products generated in the duplex filter 110 due to non-linearity of the duplex filter component itself (which may be due to the material or manufacturing technology used) is illustrated with a long dashed spectrum 124 in the receiver chain. The sum of 122, 123 and 124 is the crosstalk 131 that is undesirable and which is to be cancelled by way of the different embodiments of the present disclosure.

Figure 2A:
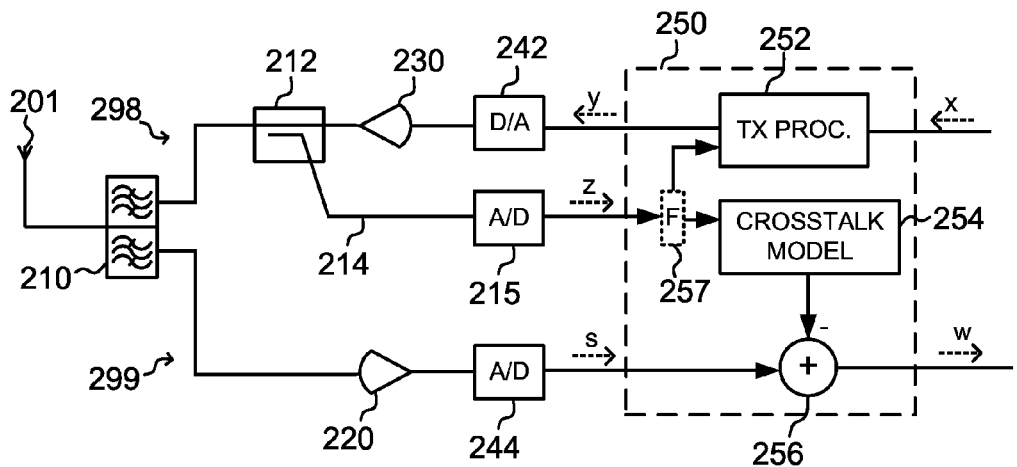
FIGS. 2a-c schematically illustrate transmitter chains and receiver chains.
Figure 2B:
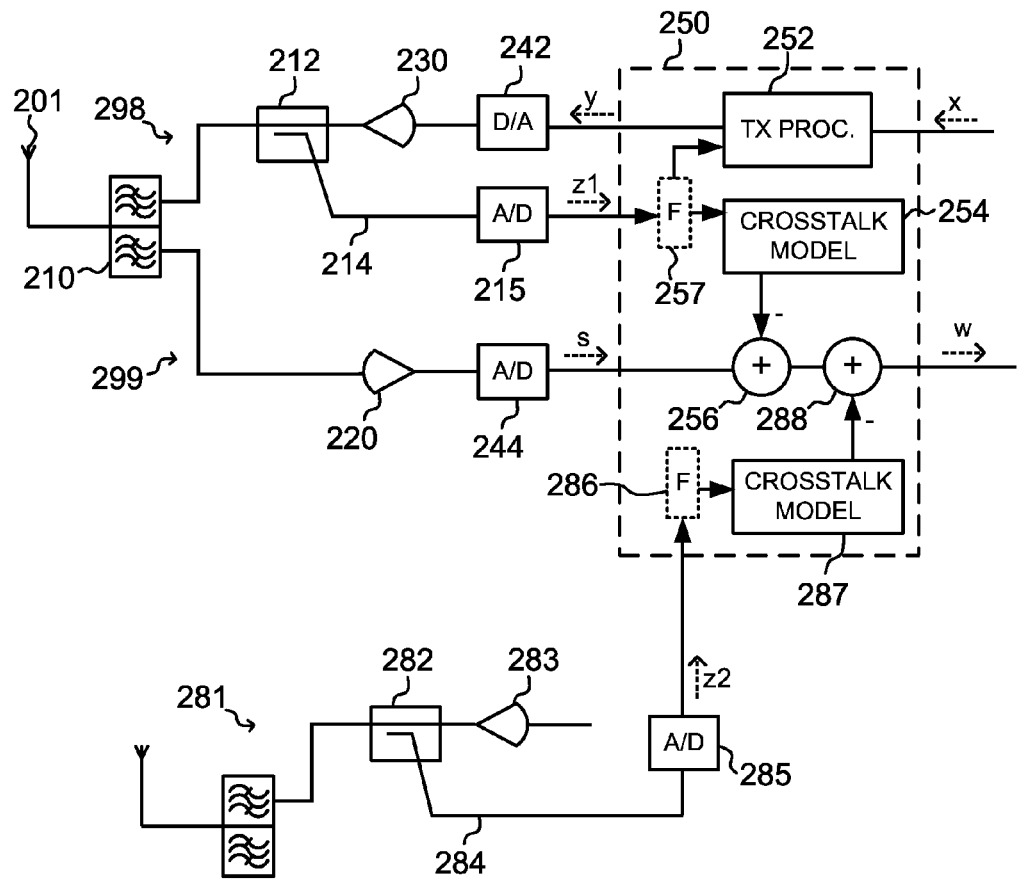
Figure 2C:
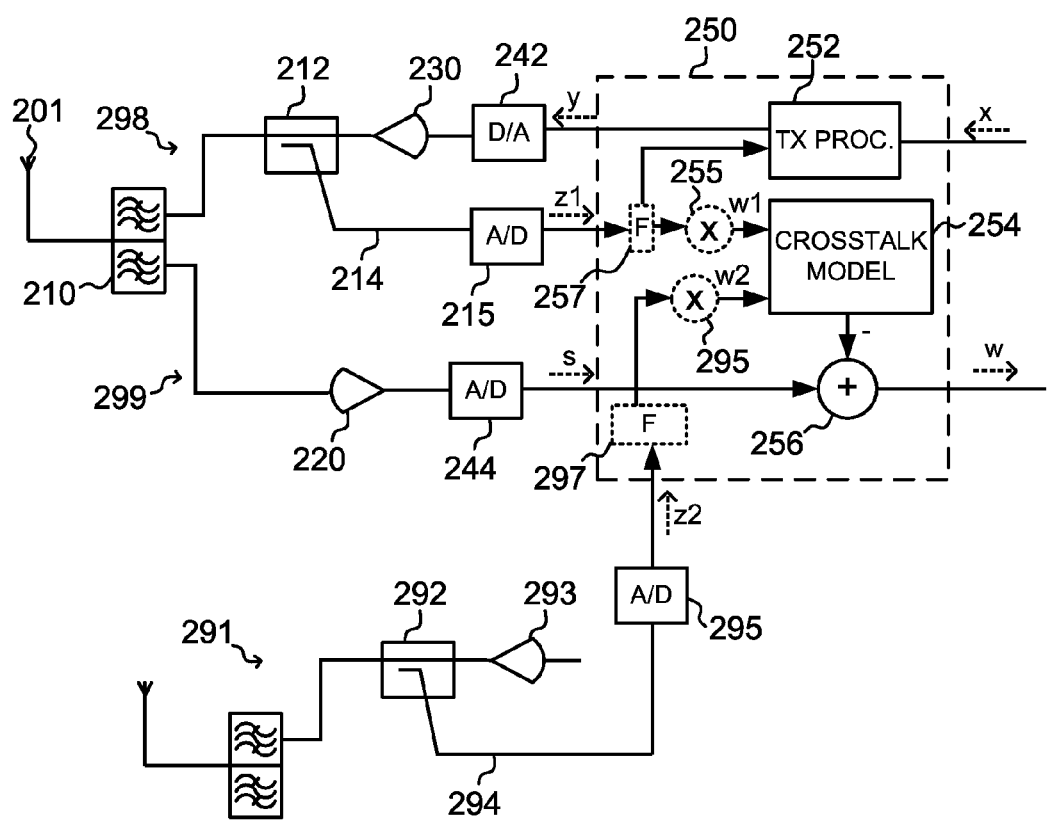
Figure 3:
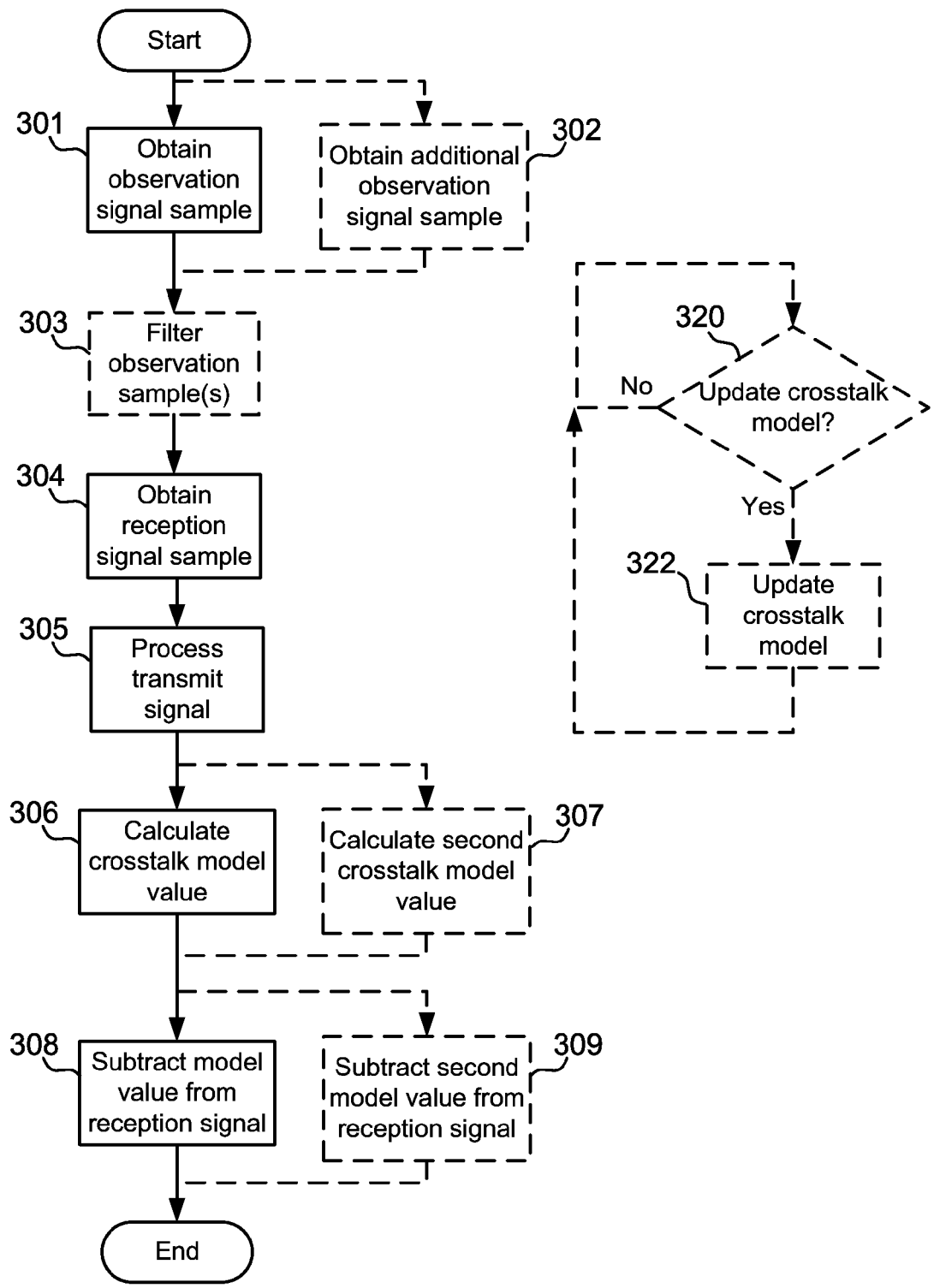
FIG. 3 is a flow chart of embodiments of methods.

Turning now to FIG. 2a and FIG. 3, and with continued reference to FIG. 1a and 1b, a method performed by the wireless communication node for cancelling crosstalk between at least one transmitter chain 298 and a receiver chain 299 will be described in terms of a number of actions. It is to be understood that FIG. 2a illustrates parts of a wireless communication node, such as the wireless communication node 100 in FIG. 1a. Similar to FIG. 1a, an antenna 201 conveys signals via a duplex filter 210 to/from the transmitter chain 298 and the receiver chain 299. The transmitter chain 298 comprises a digital-to-analogue (DA) converter 242, a power amplifier 230 and a coupler 212. The coupler 212 is a function that obtains a sample of a signal in the transmitter chain 298. Such a sample is conveyed via a line 214 and an analogue-to-digital (AD) converter 215 to a digital signal processing block 250, which is indicated with dashed lines. Frequency conversion blocks such as radio frequency mixers are omitted from FIG. 2a (and omitted also in FIGS. 2b and 2c) for the clarity of the figures. A level of a transmission signal from the transmitter chain 298 as well as a level of incoming reception signal for the receiver chain 299 may vary. Power control blocks for the transmitter chain 298 and the receiver chain 299 are also omitted for clarity reasons in FIGS. 2a, 2b and 2c.

Moreover, in the embodiments illustrated herein, automatic signal level control may be applied to both transmission and reception signals in order to maintain an optimal digital signal value for digital signal processing purposes. However, amplifiers and other circuitry that can be used to provide such automatic signal level control have been omitted for the sake of clarity.

The following actions take place in the digital signal processing block 250. It is to be noted that in the flow chart of FIG. 3, actions illustrated with dashed lines are optional.

Action 301

A digital observation signal sample z is obtained in the form of a digital sample of a signal originating from a point in a first transmitter chain 298 that is subsequent to power amplification. In FIG. 2a this is exemplified with the coupler 212 whose function is to obtain an analogue portion of the power amplified 230 signal in the transmitter chain 298. Output from the coupler 212 goes via the signal line 214 to the AD converter 215 where AD conversion takes place and the digital observation signal sample z is produced.

Action 302

In some embodiments, an additional digital observation signal sample z2 is obtained in the form of a digital sample of an additional signal originating from a point in an additional transmitter chain 281 that is subsequent to power amplification. This is exemplified in FIG. 2b with a coupler 282 whose function is to obtain an analogue portion of a power amplified 283 signal in the additional transmitter chain 281. Output from the coupler 282 goes via a signal line 284 to an AD converter 285 where AD conversion takes place and the additional digital observation signal sample z2 is produced. It is to be noted that the additional transmitter chain 281 is schematically illustrated in FIG. 2b and it is assumed that the skilled person will realize that it comprises similar function blocks as, e.g., the transmitter chain 298 in FIG. 2a.

Action 303

In some embodiments, the digital observation signal sample z is filtered, whereby a first set of information is obtained that is configured for use in the calculation 306 of the crosstalk model value from the crosstalk model, and whereby a second set of information is obtained that is configured for use in the processing 305 of the digital transmit signal sample. In FIG. 2a this is exemplified with a filter function block 257. For example, the first set of information may comprise crosstalk information relating to the first transmitter chain 298 and the receiver chain 299, the second set of information may comprise linearization information for linearizing the digital transmit signal sample x.

Action 304

A digital sample of a reception signal s is obtained from the receiver chain 299. In FIG. 2a this is exemplified such that the digital sample of a reception signal s is output from the AD converter 244.

Action 305

Based on the digital observation signal sample z, a digital transmit signal sample x originating from digital circuitry in the wireless communication node, is processed for transmission in the first transmitter chain 298. In FIG. 2a this is exemplified with a TX processing function block 252 in the digital signal processing block 250.

Action 306

Based on the digital observation signal sample z, a crosstalk model value is calculated from a crosstalk model, the crosstalk model value representing an interference signal created as a consequence of crosstalk between the first transmitter chain 298 and the receiver chain 299. In FIG. 2a this is exemplified with a crosstalk model function block 254.

Action 308

The crosstalk model value is subtracted from the digital sample of the reception signal s, thereby obtaining an output digital signal sample w from which crosstalk is cancelled. In FIG. 2a this is exemplified with an adder 256 into which a negative version of the crosstalk model value is input together with the sample of the reception signal s.

Action 307

Continuing with reference to FIG. 2b, in these embodiments, a second crosstalk model value is calculated, based on the additional digital observation signal sample z2, from an additional crosstalk model. The second crosstalk model value represents an additional interference signal created as a consequence of crosstalk between the additional transmitter chain 281 and the receiver chain 299. In FIG. 2b this is exemplified with a crosstalk model function block 287. The additional crosstalk model may in some embodiments be identical to the crosstalk model.

Action 309

Continuing with reference to FIG. 2b, in these embodiments, the second crosstalk model value is subtracted from the digital sample of the reception signal s, thereby obtaining an output digital signal sample w from which crosstalk is cancelled. In FIG. 2b this is exemplified with an adder 288 into which a negative version of the second crosstalk model value is input together with the sample of the reception signal s. It is to be noted that FIG. 2b exemplifies that the subtractions of the crosstalk model value (as illustrated by adder 256) takes place prior to the subtraction of the second crosstalk model value. The skilled person will realize that this order is not relevant in view of the result to be obtained, i.e. subtraction of two crosstalk model values from the reception signal s.

Similar to the filtering actions in action 303, the additional digital observation signal sample z2 may be filtered whereby a first additional set of information is obtained that is configured for use in the calculation of the second crosstalk model value from the additional crosstalk model. In FIG. 2b this is exemplified with a filter function block 286. Moreover, similar to the filtering in action 303, the first set of information may comprise crosstalk information relating to the additional transmitter chain 281 and the receiver chain 299.

Now with reference to FIG. 2c, in some embodiments an additional digital observation signal sample z2 is obtained in the form of a digital sample of an additional signal originating from a point in an additional transmitter chain 291 that is subsequent to power amplification. The calculation of the crosstalk model value from the crosstalk model is in these embodiments based on the digital observation signal sample and based on the additional digital observation signal sample. In these embodiments, the crosstalk model value represents an interference signal created as a consequence of crosstalk between the first transmitter chain 298 and the receiver chain 299 and crosstalk between the additional transmitter chain 291 and the receiver chain 299.

This is exemplified in FIG. 2c with a coupler 292 whose function is to obtain an analogue portion of a power amplified 293 signal in the additional transmitter chain 291. Output from the coupler 292 goes via a signal line 294 to an AD converter 295 where AD conversion takes place and the additional digital observation signal sample z2 is produced. It is to be noted that the additional transmitter chain 291 is schematically illustrated in FIGS. 2c and it is assumed that the skilled person will realize that it comprises similar function blocks as, e.g., the transmitter chain 298 in FIG. 2a.

Moreover, in these embodiments, the digital observation signal sample z1 may be used in the calculation of the crosstalk model value with a first weighting factor w1 and the additional digital observation signal sample z2 is used in the calculation of the crosstalk model value with a second weighting factor w2. This is exemplified in FIG. 2c with a first weighting function 255 and a second weighting function 295.

Similar to the filtering actions in action 303, in these embodiments relating to FIG. 2c, the additional digital observation signal sample z2 may be filtered whereby a first additional set of information is obtained that is configured for use in the calculation of the second crosstalk model value from the additional crosstalk model. In FIG. 2c this is exemplified with a filter function block 297. Moreover, similar to the filtering in action 303, the first set of information may comprise crosstalk information relating to the additional transmitter chain 291 and the receiver chain 299.

With regard to the crosstalk model and, referring to those embodiments that involve an additional crosstalk model, the crosstalk model and/or the additional crosstalk model may be a predetermined fixed algorithm. In other embodiments, any of the crosstalk model and the additional crosstalk model is an adaptive algorithm. In these embodiments, adaptation may be in the form of any of updating any of the crosstalk model and the additional crosstalk model based on a quality of the reception signal, and updating any of the crosstalk model and the additional crosstalk model by minimizing a difference between the received signal and an expected received signal (e.g. a pilot signal or a reference signal). In FIG. 3, this is exemplified with a determining action 320 and an update action 322. Actions 320 and 322 are illustrated in FIG. 3 as being disconnected from actions 301-309. The reason for this is purely for the purpose of not imposing an unnecessarily narrow interpretation of the method embodiments described herein. In fact, actions 320 and 322 may be performed at any point in the sequence of actions 301-309.

The updating in action 322 may be performed in response to any of determining (in action 320) that the quality of the received signal is below a threshold quality, and determining (in action 320) that the difference between the received signal and an expected received signal is greater than a difference threshold. In these embodiments, the quality of the received signal may be any of signal to interference ratio, signal to noise ratio, bit error rate and error vector magnitude.

Furthermore, with regard to the crosstalk model and, referring to those embodiments that involve an additional crosstalk model, the crosstalk model and/or the additional crosstalk model may comprise any of a complex filter, a non-linear model, a passive intermodulation duplex filter, an interference distortion from a transmitter chain at reception band, an attenuation of a duplex filter and direct crosstalk from the transmission chain to the receive chain due to improper isolation between the transmission chain and the reception chain.

Furthermore, with regard to the crosstalk model and, referring to those embodiments that involve an additional crosstalk model, the calculation of any of the crosstalk model value and the additional crosstalk model value may be performed in a time shared manner with the processing of the digital transmit signal sample.

The embodiments illustrated in FIGS. 2b and 2c (and corresponding actions in FIG. 3) have been provided in order to show multi transmitter configurations. Two or more transmitter chains may operate at the same frequency band, e.g. in a diversity context or multiple input multiple output (MIMO) context, or in a context with different frequency bands (e.g. carrier aggregation). Alternatively two or more transmitter chains may support different wireless communication systems or operational frequencies of transmitters and/or receivers may partly overlap each other.

It is to be noted that, although FIGS. 2b and 2c illustrate two transmitter chains, other embodiments may comprise a larger number of transmitter chains in a vicinity of one or more receiver chains. For example, if there are M receiver chains and N transmitter chains in vicinity of each other, then the cross talk from N transmitters to M receivers (N*M cross talk matrix) may be modelled. If the cross talks are similar, e.g. in situations where same hardware components are used in the transmitter chains and receiver chains, then the crosstalk models of the transmitter chains may be "re-used" or a compensation cross talk model may be reduced into a one model. This is exemplified in the embodiments relating to FIG. 2c.

Figure 4:
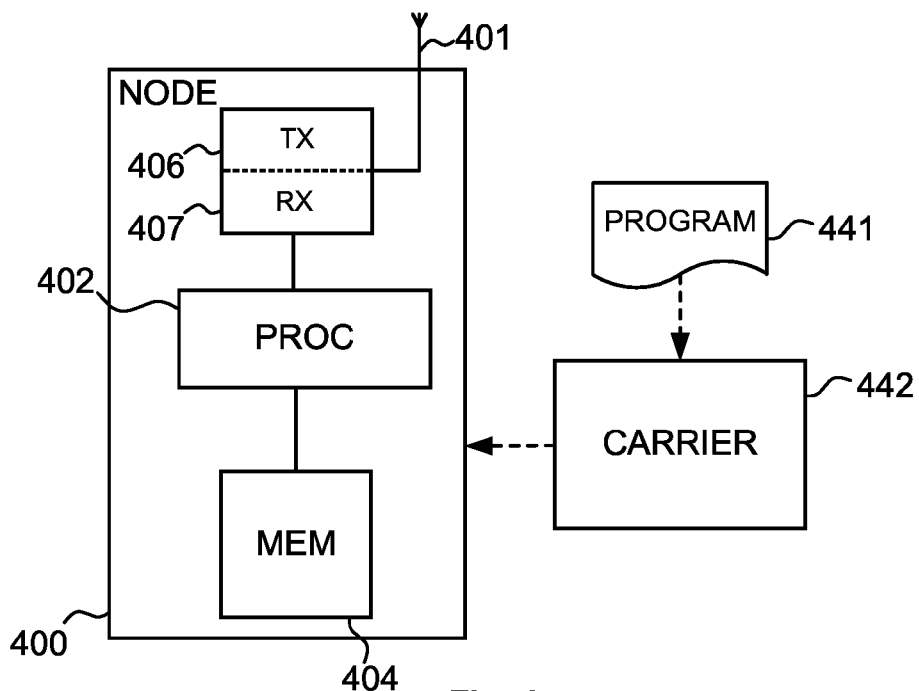
FIG. 4 schematically illustrates a wireless communication node.

Turning now to FIG. 4, a wireless communication node 400 will be described. The wireless communication node 400, which may correspond to the wireless communication node 100 in FIG. 1, comprises at least one radio frequency circuitry transmitter chain 406, a radio frequency receiver chain 407, a processor 402 and a memory 404. The transmitter chain 406 and the receiver chain 407 may correspond to the transmitter chain 298 and the receiver chain 299, respectively, in FIGS. 2a-c. The memory 404 contains instructions executable by the processor 402 whereby the wireless communication node 400 is operative to control the wireless communication node 400 by:

obtaining a digital observation signal sample in the form of a digital sample of a signal originating from a point in a first transmitter chain that is subsequent to power amplification, obtaining a digital sample of a reception signal from the receiver chain, processing, based on the digital observation signal sample, a digital transmit signal sample originating from digital circuitry in the wireless communication node, for transmission in the first transmitter chain, calculating, based on the digital observation signal sample, a crosstalk model value from a crosstalk model, the crosstalk model value representing an interference signal created as a consequence of crosstalk between the first transmitter chain and the receiver chain, subtracting the crosstalk model value from the digital sample of the reception signal, thereby obtaining an output digital signal sample from which crosstalk is cancelled.

The wireless communication node 400 may be operative to control the wireless communication node 400 by:

filtering the digital observation signal sample whereby a first set of information is obtained that is configured for use in the calculation of the crosstalk model value from the crosstalk model, and whereby a second set of information is obtained that is configured for use in the processing of the digital transmit signal sample.

In such embodiments of a wireless communication node 400, the first set of information may comprise crosstalk information relating to the first transmitter chain and the receiver chain and/or the second set of information may comprise linearization information for linearizing the digital transmit signal sample.

The wireless communication node 400 may in some embodiments comprise an additional transmitter chain, for example as illustrated in FIG. 2b where an additional transmitter chain 281 is illustrated. The wireless communication node 400 is in these embodiments operative to control the wireless communication node 400 by:

obtaining an additional digital observation signal sample in the form of a digital sample of an additional signal originating from a point in the additional transmitter chain that is subsequent to power amplification, calculating, based on the additional digital observation signal sample, a second crosstalk model value from an additional crosstalk model, the second crosstalk model value representing an additional interference signal created as a consequence of crosstalk between the additional transmitter chain and the receiver chain, and subtracting the second crosstalk model value from the digital sample of the reception signal, thereby obtaining an output digital signal sample from which crosstalk is cancelled.

In such embodiments, the wireless communication node 400 may be operative to control the wireless communication node 400 by filtering the additional digital observation signal sample whereby a first additional set of information is obtained that is configured for use in the calculation of the second crosstalk model value from the additional crosstalk model. In such embodiments of a wireless communication node 400, the first additional set of information may comprise crosstalk information relating to the additional transmitter chain and the receiver chain. Moreover, in such embodiments of a wireless communication node 400 the additional crosstalk model may be identical to the crosstalk model.

The wireless communication node 400 may in some embodiments comprise an additional transmitter chain, for example as illustrated in FIG. 2c where an additional transmitter chain 291 is illustrated. The wireless communication node 400 is in these embodiments operative to control the wireless communication node 400 by:

obtaining an additional digital observation signal sample in the form of a digital sample of an additional signal originating from a point in an additional transmitter chain that is subsequent to power amplification, and calculating the crosstalk model value from the crosstalk model, based on the digital observation signal sample and based on the additional digital observation signal sample the crosstalk model value representing an interference signal created as a consequence of crosstalk between the first transmitter chain and the receiver chain and crosstalk between the additional transmitter chain and the receiver chain.

In these embodiments of a wireless communication node 400, the wireless communication node 400 may be operative such that the digital observation signal sample may be used in the calculation of the crosstalk model value with a first weighting factor and the additional digital observation signal sample may be used in the calculation of the crosstalk model value with a second weighting factor.

In such embodiments, the wireless communication node 400 may be operative to control the wireless communication node 400 by filtering the additional digital observation signal sample whereby a first additional set of information is obtained that is configured for use in the calculation of the crosstalk model value from the crosstalk model. In these embodiments, the first additional set of information may comprise crosstalk information relating to the additional transmitter chain and the receiver chain.

In some embodiments of the wireless communication node 400, the wireless communication node 400 may be operative such that the crosstalk model and/or the additional crosstalk model may be a predetermined fixed algorithm.

In some embodiments of the wireless communication node 400, the wireless communication node 400 may be operative such that any of the crosstalk model and the additional crosstalk model is an adaptive algorithm and operative to perform adaptation in the form of any of:

updating any of the crosstalk model and the additional crosstalk model based on a quality of the reception signal, and updating any of the crosstalk model and the additional crosstalk model by minimizing a difference between the received signal and an expected received signal.

In these embodiments, the wireless communication node 400 may be operative such that the updating is performed in response to any of:

determining that the quality of the received signal is below a threshold quality, and determining that the difference between the received signal and an expected received signal is greater than a difference threshold.

In these embodiments, the wireless communication node 400 may be operative such that the quality of the received signal may be any of signal to interference ratio, signal to noise ratio, bit error rate and error vector magnitude.

In some embodiments of the wireless communication node 400, the wireless communication node 400 may be operative such that any of the crosstalk model and the additional crosstalk model may comprise any of:
- a complex filter,
- a non-linear model,
- a passive intermodulation duplex filter,
- an attenuation of a duplex filter,
- an interference distortion from a transmitter chain at reception band,
- direct crosstalk from the transmission chain to the receive chain due to improper isolation between the transmission chain and the reception chain.

In some embodiments of the wireless communication node 400, the wireless communication node 400 may be operative such that the calculation of any of the crosstalk model value and the additional crosstalk model value may be performed in a time shared manner with the processing of the digital transmit signal sample.

The instructions that are executable by the processor 402 may be software in the form of a computer program 441. The computer program 441 may be contained in or by a carrier 442, which may provide the computer program 441 to the memory 404 and processor 402. The carrier 442 may be in any suitable form including an electronic signal, an optical signal, a radio signal or a computer readable storage medium.

Figure 5:
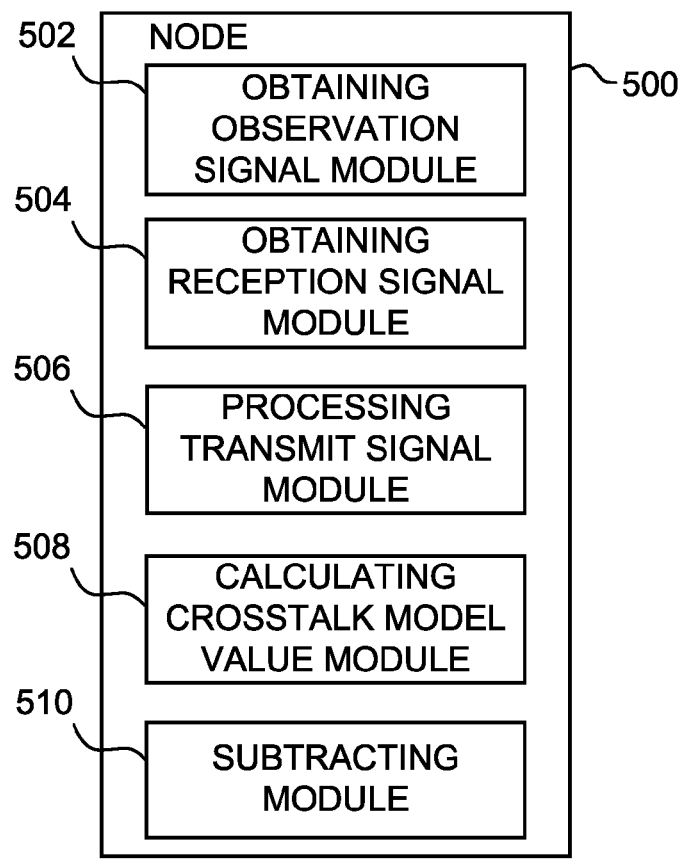
FIG. 5 schematically illustrates a wireless communication node.

Turning now to FIG. 5, a wireless communication node 500 will be described. The wireless communication node 500, which may correspond to the wireless communication node 100 in FIG. 1, comprises:
- an obtaining module 502 configured to obtain a digital observation signal sample in the form of a digital sample of a signal originating from a point in a first transmitter chain that is subsequent to power amplification,
- an obtaining module 504 configured to obtain a digital sample of a reception signal from the receiver chain,
- a processing module 506 configured to process, based on the digital observation signal sample, a digital transmit signal sample originating from digital circuitry in the wireless communication node, for transmission in the first transmitter chain,
- a calculation module 508 configured to calculate, based on the digital observation signal sample, a crosstalk model value from a crosstalk model, the crosstalk model value representing an interference signal created as a consequence of crosstalk between the first transmitter chain and the receiver chain,
- a subtracting module 510 configured to subtract the crosstalk model value from the digital sample of the reception signal, thereby obtaining an output digital signal sample from which crosstalk is cancelled.

The wireless communication node 500 may comprise further modules that are configured to operate in a similar manner as the wireless communication node 400 described above in connection with FIG. 4.

In some embodiments, the use of the cross talk model may be activated based on a signal level at radio frequency in the transmitter chain and/or in the receiver chain. For example, the crosstalk model may be activated if a signal level of the transmission is higher than a first threshold value and/or if a signal level of the reception is lower than a second threshold value.

As used herein, the term "processing module" or "module" may refer to a processing circuit, a processing unit, a processor, an Application Specific integrated Circuit (ASIC), a Field-Programmable Gate Array (FPGA) or the like. As an example, a processor, an ASIC, an FPGA or the like may comprise one or more processor kernels. In some examples, the processing module may be embodied by a software module or hardware module. Any such module may be a determining means, estimating means, capturing means, associating means, comparing means, identification means, selecting means, receiving means, transmitting means or the like as disclosed herein. As an example, the expression "means" may be a module, such as a determining module, selecting module, etc.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a Memory Stick, a Multimedia Card (MMC), etc.

As used herein, the term "computer readable code units" may be text of a computer program, parts of or an entire binary file representing a computer program in a compiled format or anything there between.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a wireless communication node, for cancelling crosstalk between at least one transmitter chain and a receiver chain, the method comprising:
   obtaining a digital observation signal sample in the form of a digital sample of a signal originating from a point in a first transmitter chain that is subsequent to power amplification;
   obtaining a digital sample of a reception signal from the receiver chain;
   processing, based on the digital observation signal sample, a digital transmit signal sample originating from digital circuitry in the wireless communication node, for transmission in the first transmitter chain;
   calculating, based on the digital observation signal sample, a crosstalk model value from a crosstalk model, the crosstalk model value representing an interference signal created as a consequence of crosstalk between the first transmitter chain and the receiver chain; and
   subtracting the crosstalk model value from the digital sample of the reception signal, thereby obtaining an output digital signal sample from which crosstalk is cancelled.

2. The method of claim 1, comprising:
filtering the digital observation signal sample whereby a first set of information is obtained that is configured for use in the calculation of the crosstalk model value from the crosstalk model, and whereby a second set of information is obtained that is configured for use in the processing of the digital transmit signal sample.

3. The method of claim 2, wherein the first set of information comprises crosstalk information relating to the first transmitter chain and the receiver chain.

4. The method of claim 2, wherein the second set of information comprises linearization information for linearizing the digital transmit signal sample.

5. The method of claim 1, further comprising:
obtaining an additional digital observation signal sample in the form of a digital sample of an additional signal originating from a point in an additional transmitter chain that is subsequent to power amplification;
calculating, based on the additional digital observation signal sample, a second crosstalk model value from an additional crosstalk model, the second crosstalk model value representing an additional interference signal created as a consequence of crosstalk between the additional transmitter chain and the receiver chain; and
subtracting the second crosstalk model value from the digital sample of the reception signal, thereby obtaining an output digital signal sample from which crosstalk is cancelled.

6. The method of claim 5, comprising:
filtering the additional digital observation signal sample whereby a first additional set of information is obtained that is configured for use in the calculation of the second crosstalk model value from the additional crosstalk model.

7. The method of claim 6, wherein the first additional set of information comprises crosstalk information relating to the additional transmitter chain and the receiver chain.

8. The method of claim 5, wherein the additional crosstalk model is identical to the crosstalk model.

9. The method of claim 1, comprising:
obtaining an additional digital observation signal sample in the form of a digital sample of an additional signal originating from a point in an additional transmitter chain that is subsequent to power amplification; and
calculating the crosstalk model value from the crosstalk model, based on the digital observation signal sample and based on the additional digital observation signal sample the crosstalk model value representing an interference signal created as a consequence of crosstalk between the first transmitter chain and the receiver chain and crosstalk between the additional transmitter chain and the receiver chain.

10. The method of claim 9, wherein the digital observation signal sample is used in the calculation of the crosstalk model value with a first weighting factor and the additional digital observation signal sample is used in the calculation of the crosstalk model value with a second weighting factor.

11. The method of claim 9, comprising:
filtering the additional digital observation signal sample whereby a first additional set of information is obtained that is configured for use in the calculation of the crosstalk model value from the crosstalk model.

12. The method of claim 11, wherein the first additional set of information comprises crosstalk information relating to the additional transmitter chain and the receiver chain.

13. The method of claim 5 wherein at least one of the crosstalk model and the additional crosstalk model is a predetermined fixed algorithm.

14. The method of claim 5, wherein any of the crosstalk model and the additional crosstalk model is an adaptive algorithm and where the method further comprises adaptation in the form of any of:
updating any of the crosstalk model and the additional crosstalk model based on a quality of the reception signal, and
updating any of the crosstalk model and the additional crosstalk model by minimizing a difference between the received signal and an expected received signal.

15. The method of claim 14, wherein the updating is performed in response to any of:
determining that the quality of the received signal is below a threshold quality, and
determining that the difference between the received signal and an expected received signal is greater than a difference threshold.

16. The method of claim 14, wherein the quality of the received signal is any of:
signal to interference ratio,
signal to noise ratio,
bit error rate, and
error vector magnitude.

17. The method of claim 5, wherein any of the crosstalk model and the additional crosstalk model comprises any of:
a complex filter,
a non-linear model,
a passive intermodulation duplex filter,
an attenuation of a duplex filter,
an interference distortion from a transmitter chain at reception band, and
direct crosstalk from the transmission chain to the receive chain due to improper isolation between the transmission chain and the reception chain.

18. The method of claim 5, wherein the calculation of any of the crosstalk model value and the additional crosstalk model value is performed in a time shared manner with the processing of the digital transmit signal sample.

19. A wireless communication node, comprising:
at least one radio frequency circuitry transmitter chain;
a radio frequency receiver chain;
a processor and a memory, the memory containing instructions executable by the processor whereby the wireless communication node is operative to control the wireless communication node by:
obtaining a digital observation signal sample in the form of a digital sample of a signal originating from a point in a first transmitter chain that is subsequent to power amplification,
obtaining a digital sample of a reception signal from the receiver chain,
processing, based on the digital observation signal sample, a digital transmit signal sample originating from digital circuitry in the wireless communication node, for transmission in the first transmitter chain,
calculating, based on the digital observation signal sample, a crosstalk model value from a crosstalk model, the crosstalk model value representing an interference signal created as a consequence of crosstalk between the first transmitter chain and the receiver chain, subtracting the crosstalk model value from the digital sample of the reception signal, thereby obtaining an output digital signal sample from which crosstalk is cancelled.

20. The wireless communication node of claim 19, comprising an additional transmitter chain and whereby the wireless communication node is operative to control the wireless communication node by:
obtaining an additional digital observation signal sample in the form of a digital sample of an additional signal originating from a point in the additional transmitter chain that is subsequent to power amplification,
calculating, based on the additional digital observation signal sample, a second crosstalk model value from an additional crosstalk model, the second crosstalk model value representing an additional interference signal created as a consequence of crosstalk between the additional transmitter chain and the receiver chain, and
subtracting the second crosstalk model value from the digital sample of the reception signal, thereby obtaining an output digital signal sample from which crosstalk is cancelled.

21. The wireless communication node of claim 19, comprising an additional transmitter chain and whereby the wireless communication node is operative to control the wireless communication node by:
obtaining an additional digital observation signal sample in the form of a digital sample of an additional signal originating from a point in the additional transmitter chain that is subsequent to power amplification, and
calculating the crosstalk model value from the crosstalk model, based on the digital observation signal sample and based on the additional digital observation signal sample.

22. A non-transitory computer readable medium having instructions stored therein in the form of a computer program, which, when executed on at least one processor in a wireless communication node, cause the wireless communication node to perform operations, the operations comprising:
obtaining a digital observation signal sample in the form of a digital sample of a signal originating from a point in a first transmitter chain that is subsequent to power amplification;
obtaining a digital sample of a reception signal from a receiver chain;
processing, based on the digital observation signal sample, a digital transmit signal sample originating from digital circuitry in the wireless communication node, for transmission in the first transmitter chain;
calculating, based on the digital observation signal sample, a crosstalk model value from a crosstalk model, the crosstalk model value representing an interference signal created as a consequence of crosstalk between the first transmitter chain and the receiver chain; and
subtracting the crosstalk model value from the digital sample of the reception signal, thereby obtaining an output digital signal sample from which crosstalk is cancelled.

* * * * *